United States Patent
Chen et al.

(10) Patent No.: US 9,500,931 B2
(45) Date of Patent: Nov. 22, 2016

(54) NONLINEAR OPTICAL DEVICE MANUFACTURED WITH 4H SILICON CARBIDE CRYSTAL

(75) Inventors: Xiaolong Chen, Beijing (CN); Shunchong Wang, Beijing (CN); Tonghua Peng, Beijing (CN); Gang Wang, Beijing (CN); Chunjun Liu, Beijing (CN); Wenjun Wang, Beijing (CN); Shifeng Jin, Beijing (CN)

(73) Assignee: Institute of Physics, Chinese Academy of Sciences, Beijing (CN)

( * ) Notice: Subject to any disclaimer, the term of this patent is extended or adjusted under 35 U.S.C. 154(b) by 25 days.

(21) Appl. No.: 14/370,510

(22) PCT Filed: Jan. 6, 2012

(86) PCT No.: PCT/CN2012/070097
§ 371 (c)(1),
(2), (4) Date: Oct. 10, 2014

(87) PCT Pub. No.: WO2013/102307
PCT Pub. Date: Jul. 11, 2013

(65) Prior Publication Data
US 2015/0085349 A1    Mar. 26, 2015

(51) Int. Cl.
*G02F 1/355* (2006.01)
*G02F 1/35* (2006.01)
(Continued)

(52) U.S. Cl.
CPC ............. *G02F 1/3551* (2013.01); *G02F 1/353* (2013.01); *G02F 1/355* (2013.01); *G02F 1/361* (2013.01);
(Continued)

(58) Field of Classification Search
CPC ....... G02F 1/353; G02F 1/3551; G02F 1/361
See application file for complete search history.

(56) References Cited

U.S. PATENT DOCUMENTS 3,676,695 A     7/1972 Singh et al.
6,861,672 B2 *  3/2005 Kamiyama ............ B82Y 20/00
                                             257/103
(Continued)

FOREIGN PATENT DOCUMENTS

CN      201226412 Y     4/2009
CN      101614928 A    12/2009
WO   WO-2013/102307 A1  7/2013

OTHER PUBLICATIONS

Lundquist et al., "Second Harmonic Generation in Hexagonal Silicon Carbide", Appl. Phys. Lett. 66 (15), Apr. 10, 1995, pp. 1883-1885.*

(Continued)

*Primary Examiner* — Daniel Petkovsek
(74) *Attorney, Agent, or Firm* — Schwegman Lundberg & Woessner, P.A.

(57) ABSTRACT

Provided is a nonlinear optical device manufactured with 4H silicon carbide crystal. The nonlinear optical crystal may be configured to alter at least a light beam (12) at a frequency to generate at least a light beam (16) at a further frequency different from the frequency. The nonlinear optical crystal comprises a 4H silicon carbide crystal (13). The nonlinear optical device is more compatible with practical applications in terms of outputting mid-infrared laser at high power and high quality and thus are more applicable in practice, because the 4H silicon carbide crystal has a relatively high laser induced damage threshold, a relatively broad transmissive band (0.38-5.9 μm and 6.6-7.08 μm), a relatively great $2^{nd}$-order nonlinear optical coefficient ($d_{15}$=6.7 pm/V), a relatively great birefringence, a high thermal conductivity (490 $Wm^{-1}K^{-1}$), and a high chemical stability.

6 Claims, 7 Drawing Sheets

(51) Int. Cl.
*G02F 1/361* (2006.01)
*G02F 1/39* (2006.01)
*H01S 3/23* (2006.01)
*H01S 3/00* (2006.01)

(52) U.S. Cl.
CPC ........... *G02F 1/39* (2013.01); *G02F 2001/392* (2013.01); *H01S 3/0064* (2013.01); *H01S 3/0092* (2013.01); *H01S 3/2391* (2013.01)

(56) References Cited

U.S. PATENT DOCUMENTS

| | | | |
|---|---|---|---|
| 8,859,387 B2 * | 10/2014 | Honke | H01L 22/10 438/16 |
| 2007/0035810 A1 | 2/2007 | Henderson | |
| 2009/0072243 A1 * | 3/2009 | Suda | H01L 21/26506 257/77 |

OTHER PUBLICATIONS

International Application Serial No. PCT/CN2012/070097, International Preliminary Report on Patentability dated Jul. 8, 2014, (w/ English Translation), 14 pgs.

"International Application Serial No. PCT/CN2012/070097, International Search Report mailed Mar. 22, 2012", (w/ English Translation), 10 pgs.

"International Application Serial No. PCT/CN2012/070097, Written Opinion mailed Mar. 22, 2012", (w/ English Translation), 7 pgs.

Baugher, Benjamin, et al., "Temperature dependence of the birefringence of SiC", *Optical Materials*, 23, (2003), 519-528.

Choyke, W. J., et al., "Refractive Index and Low-Frequency Dietlectric Constant of 6H SiC", *Journal of the Optical Society of America*, 58(3), (1968), 377-379.

Choyke, W. J., et al., "Silicon Carbide (SiC)", In: *Handbook of Optical Constants of Solids*, Palik, Edward D., Editor, Academic Press, Inc., Orlando, FL, (1985), 587-595.

Dmitriev, V. G., et al., *Handbook of Nonlinear Optical Crystals*, Springer, Berlin, (1999), p. 118.

Niedermeier, S., et al., "Second-harmonic generation in silicon carbide polytypes", *Applied Physics Letters*, 75(5), (1999), 618-620.

Rashkeev, S. N., et al., "Second-harmonic generation in SiC polytypes", *Physical Review B*, 57(16), (1998), 9705-9715.

Sato, Hiroaki, et al., "Accurate measurements of second-order nonlinear optical coefficients of 6H and 4H silicon carbide", *Journal of the Optical Society of America B 26*, (2009), 1892-1896.

Shaffer, P. T. B., "Refractive Index, Dispersion, and Birefringence of Silicon Carbide Polytypes", *Applied Optics*. 10(5), (1971), 1034-1036.

Thibault, Newman W., "Morphological and structural crystallography and optical properties of silicon carbide (SIC)", *The American Mineralogist*, 29, (1944), 249-278.

\* cited by examiner

NONLINEAR OPTICAL DEVICE MANUFACTURED WITH 4H SILICON CARBIDE CRYSTAL

This application is a U.S. National Stage Application filed under 35 U.S.C §371 of International Application Serial No. PCT/CN2012/070097, filed on Jan. 6, 2012 and published as WO 2013/102307 A1 on Jul. 11, 2013, which application and publication are incorporated herein by reference in their entireties.

TECHNICAL FIELD

The present disclosure generally relates to the material technology and the laser technology, and particularly, to a nonlinear optical device manufactured with a 4H silicon carbide crystal.

BACKGROUND

The mid-infrared band (3-5 μm) is an important atmospheric transmission window. Laser in this band can transmit through fog, smoke or the like in the atmosphere. Therefore, mid-infrared laser can be widely used in military applications, such as laser guiding, electrooptical countermeasures, object detection, and the like. Further, most hydrocarbon gas and other toxic gas molecules have relatively strong absorption in the 3-5 μm band. Therefore, the mid-infrared laser also has a variety of applications in gas detection, atmospheric remote sensing and environmental protection, and the like.

Due to absence of direct laser gain medium, the mid-infrared laser is generated mostly by nonlinear optical frequency conversion, such as optical parametric oscillation, optical parametric amplification, and difference frequency generation. In the 3-5 μm band, the nonlinear optical crystals used so far include $LiNbO_3$, $KTiOPO_4$, $AgGaS_2$, $ZnGeP_2$, and the like. They usually have relatively high nonlinear optical coefficients, but their laser induced damage thresholds are very low. For example, $LiNbO_3$ has a laser induced damage threshold of about 120 $MW/cm^2$ (1.064 μm, 30 ns), $KTiOPO_4$ has a laser induced damage threshold of about 150 $MW/cm^2$ (1.064 μm, 30 ns), $AgGaS_2$ has a laser induced damage threshold of about 25 $MW/cm^2$ (1.064 μm, 35 ns), and $ZnGeP_2$ has a laser induced damage threshold of about 3 $MW/cm^2$ (1.064 μm, 30 ns) (see Dmitriev et al., Handbook of Nonlinear Optical Crystals, Springer, Berlin, 1999, p. 118). Therefore, it is the low damage threshold that limits the various applications of those mid-infrared nonlinear optical crystals.

Silicon carbides crystalline in more than 250 polytypes, among which, 3C silicon carbide, 4H silicon carbide, and 6H silicon carbide are the most common ones. Especially, 4H silicon carbide and 6H silicon carbide have non-zero $2^{nd}$-order nonlinear optical coefficients, and have the following characteristics:

1. Relatively large $2^{nd}$-order nonlinear optical coefficients ($d_{15}$=6.7 pm/V for 4H silicon carbide, and $d_{15}$=6.6 pm/V for 6H silicon carbide) (see Sato et al., Accurate measurements of second-order nonlinear optical coefficients of 6H and 4H silicon carbide, Journal of the Optical Society of America B 26, 1892 (2009));
2. Relatively high transmittance in the visible and infrared spectra (specifically, 4H silicon carbide is transmissive in a range of 0.38-5.5 μm, and 6H silicon carbide is transmissive in a range of 0.4-5.5 μm);
3. Relatively high laser induced damage thresholds (greater than 80 $GW/cm^2$ (1.064 μm, 10 ns) for both 4H and 6H silicon carbide) (see Niedermeier et al., Second-harmonic generation in silicon carbide polytypes, Applied Physics Letter. 75, 618 (1999));
4. High thermal conductivity (490 $Wm^{-1}K^{-1}$ for both 4H and 6H silicon carbide), good chemical stability, not easy to deliquescence; and
5. Developed crystal growth technology, and good crystal qualities.

4H and 6H silicon carbide both are positive uniaxial crystals ($n_o < n_e$). Prior to studying the nonlinear optical properties, it is important to accurately measure refractive indices of them. At a given temperature, the phase matching condition for nonlinear optical frequency conversion is determined only by refractive indeices of the crystal. The nonlinear frequency conversion can be performed efficiently and thus becomes feasible only if the phase matching condition is satisfied.

In 1944, Thibault firstly measured, using the method of minimum deviation angle, the refractive indices of the 6H silicon carbide crystal in a visible band (0.4047-0.6708 μm) with a measurement precision of about $3 \times 10^{-4}$ (see Thibault, Morphological and structural crystallography and optical properties of silicon carbide (SiC), The American Mineralogist 29, 327 (1944)). In 1968, Choyke et al. measured, using the Newton interference of equal inclination, the refractive indices for o-ray ($n_o$) of the 6H silicon carbide crystal with a measurement precision of about $2 \times 10^{-3}$, and extended $n_o$ to the ultraviolet and infrared bands (see Choyke et al., Refractive index and low-frequency dielectric constant of 6H SiC, Journal of the Optical Society of America 58, 377 (1968)). In 1971, Shaffer measured the refractive indices of the 4H and 6H silicon carbide crystals in a visible band (0.467-0.691 μm) with a measurement precision of about $1 \times 10^{-3}$, and obtained their dispersion equations (see Shaffer, Refractive index, dispersion, and birefringence of silicon carbide polytypes, Applied Optics 10, 1034 (1971)).

U.S. Pat. No. 3,676,695 issued in 1972, entitled "Nonlinear optical devices utilizing substantially hexagonal silicon carbide," and also its patent family (CA 962755, NL 7210039, SE 3676695, IT 964758, GB 1375638, FR 2147103, DE 2235800, and BE 786555) disclosed the refractive indices of a hexagonal silicon carbide crystal at six wavelengths (0.488 μm, 0.5017 μm, 0.5145 μm, 0.5321 μm, 0.6328 μm, and 1.064 μm) measured by the method of minimum deviation angle. The absorption spectrum of the silicon carbide crystal disclosed in this patent shows that the shortest transmissive wavelength for this crystal is 0.4 μm, corresponding to a band gap (3.0 eV) of 6H silicon carbide. The refractive indices further demonstrate that this crystal is 6H silicon carbide. This patent proposed that 6H silicon carbide can be used as a nonlinear optical crystal for frequency conversion, such as frequency multiplication and optical parametric conversion, by angular phase matching, and that at least one light beam participating in the nonlinear optical frequency conversion has a wavelength greater than 1 μm. The inventors of this patent, Singh et al., proposed in a later published paper that 6H silicon carbide can achieve phase matching for frequency conversion when a fundamental light has a wavelength greater than 2 μm, and especially that a phase matching angle for second harmonic generation is about 75° when the fundamental light has a wavelength of 2.128 μm (see Singh et al., Nonlinear optical properties of hexagonal silicon carbide, Applied Physics Letters 19, 53 (1971)). It is to be noted that in this patent a light source adopted in measuring the refractive indices of 6H silicon carbide has a maximal wavelength of 1.064 μm, but the nonlinear optical frequency conversion involves a relatively large wavelength in the infrared band (e.g., 2.128 μm). It is known that the refractive index at a relatively large wavelength obtained by extrapolation from a dispersion equation fitted based on refractive indices at relatively short wavelengths will deviate a lot from the real one. The inventors of the present application demonstrate with new refractive index data that 6H silicon carbide is out of the question for second harmonic generation and optical parametric conversion in the infrared band. In other words, the above patents issued to Singh et al. are impossible to practice, which will be described in more detail in the following.

In 1985, Choyke et al. provided in a document (Choyke et al., Handbook of Optical Constants of Solids, Academic, New York, 1985, p. 593) data relating to the refractive index $n_o$ of 6H silicon carbide, most of which were cited from the above papers by Thibault in 1944, Choyke et al. in 1968, and Shaffer et al. in 1971, and just simply listed the data from these papers. Because these three works measured the refractive index in different ways, many of the data relating to the refractive index $n_o$ provided by Choyke et al. in 1985 are not reasonable. According to the well known knowledge, the refractive index $n_o$ should decrease as the wavelength increases. However, the refractive index $n_o$ proposed in the document of Choyke et al. does not follow this rule. For example, in this document, $n_o$ has a value of 2.684 at the wavelength of 0.4959 μm, which is smaller than that (2.687) at the wavelength of 0.498 μm. In 2003, Baugher et al. measured birefringence data ($n_e$-$n_o$) of 6H silicon carbide by using the data relating to the refractive index $n_o$ provided by Choyke et al. in 1985, and pointed out by computations that 6H silicon carbide can satisfy the phase matching condition for optical parametric oscillation (see Baugher et al., Temperature dependence of the birefringence of SiC, Optical Materials 23, 519 (2003)). Baugher et al. measured only the birefringence data of the 6H silicon carbide crystal, and cited the incorrect refractive index data. As a result, their conclusion that the phase matching condition for optical parametric oscillation can be satisfied in 6H silicon carbide is incorrect.

As can be seen from the above, most of the prior art documents or papers measured the refractive indices of the 6H silicon carbide crystal in the visible band, and there are rare results in the infrared band at a relatively longer wavelength side. However, the nonlinear optical frequency conversion of the 6H silicon carbide crystal generally involves the infrared band. To reduce the deviation caused by extrapolation of the refractive index based on from the dispersion equations based on refractive indices of relatively short wavelengths, it is pressing and important to preciously measure the refractive indices of 6H silicon carbide in the infrared band.

The inventors of the present application measured, using the method of minimum deviation angle, the refractive indices ($n_o$ and $n_e$) of the 6H silicon carbide crystal in both a visible band and an infrared band (0.4358-2.325 μm), with a precision of about $3 \times 10^{-5}$, and fitted the dispersion equations for the 6H silicon carbide crystal. Compared to the refractive index data proposed in the above documents, the measurement result by the inventors generally coincides with the refractive index data in those documents in the visible band, but shows relatively great dispersion in the infrared band.

Further, the inventors of the present application computed the phase matching condition for nonlinear frequency conversion of the 6H silicon carbide crystal. 6H silicon carbide crystal has a point group of 6 mm, and only Type II angular phase matching exits therein. For the angular phase matching of second harmonic generation, it should be satisfied that $n_{1o}+n_{1e}>2n_{2o}$ (which is derived from that a sine value of a phase matching angle should be less than 1), where $n_{1o}$ and $n_{1e}$ indicate an o-ray refractive index and an e-ray refractive index for fundamental light, respectively, and $n_{2o}$ indicates an o-ray refractive index for light after second harmonic generation. As 6H silicon carbide has relatively great dispersion while relatively small birefringence in the infrared band, computations show that the 6H silicon carbide crystal cannot achieve the phase matching conditions for second harmonic generation in its transmissive band (0.4-5.5 μm). For nonlinear frequency conversion such as optical parametric conversion and difference frequency generation, the phase matching condition is: $n_{3o}\omega_3 - n_{1e}(\theta)\omega_1 = n_{2o}\omega_2$, where $\omega_3$ and $\omega_1$ indicate frequencies of pumping light, $\omega_2$ indicates a frequency of infrared light, $n_{3o}$ indicates an o-ray refractive index for the pumping light $\omega_3$, $n_{2o}$ indicates an o-ray refractive index for the infrared light $\omega_2$, and $n_{1e}(\theta)$ indicates an e-ray refractive index for the pumping light $\omega_1$ at an angle θ with respect to the optical axis of crystal. Computations show that the 6H silicon carbide crystal cannot achieve the phase matching conditions for optical parametric conversion or difference frequency generation in its transmissive band. The U.S. patent (U.S. Pat. No. 3,676,695) and the paper of Baugher et al. in 2003 adopted the incorrect refractive index data, and thus arrived at the incorrect conclusion that the 6H silicon carbide crystal can achieve the phase matching for nonlinear frequency conversion in the mid-infrared band.

In 1971, Shaffer measured refractive indices of 4H silicon carbide in a visible band (0.467-0.691 μm) (see Shaffer, Refractive index, dispersion, and birefringence of silicon carbide polytypes, Applied Optics 10, 1034 (1971)). There is no report on nonlinear optical properties of the 4H silicon carbide crystal and applications of the 4H silicon carbide crystal in nonlinear optical devices.

SUMMARY

The present disclosure aims to provide, among others, a nonlinear optical device manufactured with 4H silicon carbide crystal.

According to an aspect of the present disclosure, there is provided a nonlinear optical device comprising at least a nonlinear optical crystal configured to alter at least a light beam at a frequency to generate at least a light beam at a further frequency different from the frequency, wherein the nonlinear optical crystal comprises 4H silicon carbide crystal.

According to a further aspect of the present disclosure, there is provided a tunable mid-infrared laser, comprising a first pumping light source and a second pumping light source which emit light beams at different frequencies, respectively, and a 4H silicon carbide crystal, wherein the light beams emitted from the first and second pumping light sources are incident onto the 4H silicon carbide crystal for difference frequency to emit mid-infrared light.

According to a still further aspect of the present disclosure, there is provided an optical parametric amplifier device, comprising a third pumping light source, a wideband signal light laser, and a 4H silicon carbide crystal, wherein a light beam emitted from the third pumping light source and a signal light beam emitted from the wide-band signal light laser are incident onto the 4H silicon carbide crystal for optical parametric amplification to emit mid-infrared light.

According to a still further aspect of the present disclosure, there is provided a wide-band tunable mid-infrared laser, comprising a fourth pumping light source, which is a wide-band pulse laser, and a 4H silicon carbide crystal, wherein a relatively high frequency component and a relatively low frequency component of pumping light emitted from the fourth pumping light source are subjected to a difference frequency operation in the 4H silicon carbide crystal, and then pass through a light filter to emit wide-band mid-infrared laser light.

The nonlinear optical device manufactured with the 4H silicon carbide crystal achieves nonlinear optical frequency conversion in the mid-infrared band by means of the 4H silicon carbide crystal. As compared to existing nonlinear optical devices, the nonlinear optical device disclosed herein is more compatible with practical applications in terms of outputting mid-infrared laser at high power and high quality and thus are more applicable in practice, because the 4H silicon carbide crystal has a relatively high laser induced damage threshold, a relative broad transmissive band (0.38-5.9 μm and 6.6-7.08 μm), a relatively great $2^{nd}$-order nonlinear optical coefficient ($d_{15}$=6.7 pm/V), a relatively great birefringence, a high thermal conductivity (490 $Wm^{-1}K^{-1}$), and a high chemical stability.

DETAILED DESCRIPTION

To make objects, features, and advantages of the present disclosure become more apparent, embodiments of the present disclosure will be described in more detail with reference to the drawings.

According to an embodiment of the present disclosure, a 4H silicon carbide crystal, with a chemical formula of 4H—SiC, is provided as a nonlinear optical crystal. The 4H silicon carbide crystal has an effective $2^{nd}$-order nonlinear optical polarization coefficient of $d_{eff}=d_{15}$ sin θ. Because the 4H silicon carbide crystal has a point group of 6 mm, there is only Type II phase matching therein (i.e., two incident light beams have different polarization directions, one of which is o-ray, the other of which is e-ray). Here, θ indicates a phase matching angle.

The 4H silicon carbide crystal has no centerosymmetry, belongs to the hexagonal system, and has a space group of $P6_3mc$, where each cell includes four carbon/silicon atom layers arranged in ABCB.

The 4H silicon carbide crystal may be grown by physical vapor transport, high-temperature chemical vapor deposition, or liquid phase methods. To make the 4H silicon carbide crystal has a relatively great transmittance, the 4H silicon carbide crystal may be grown with a high purity by controlling purities of silicon carbide raw material and consumptive materials in a growing chamber. Alternatively, the transmittance may be enhanced by intentionally doping. For example, it is possible to compensate for n-type impurities (e.g., nitrogen) by p-type doping (e.g., Al or B doping), or to compensate for donors (e.g., nitrogen) or acceptors (e.g., B or Al) at a relatively shallow energy level by doping vanadium at a relatively deep energy level, or by introducing point defects.

Figure 1:
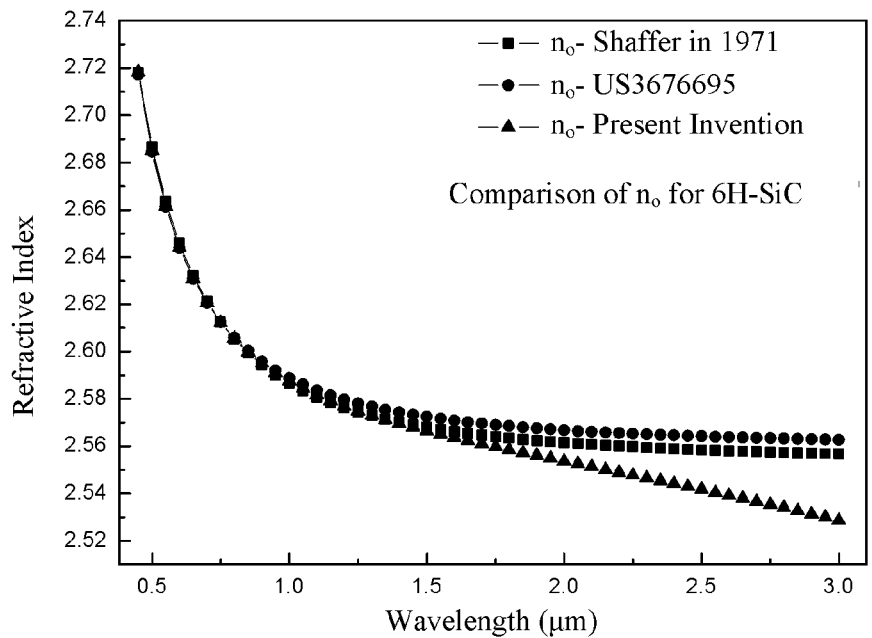
FIG. 1 shows a comparison between a dispersion curve of $n_o$ and prior art $n_o$ data for 6H silicon carbide crystal.
Figure 2:
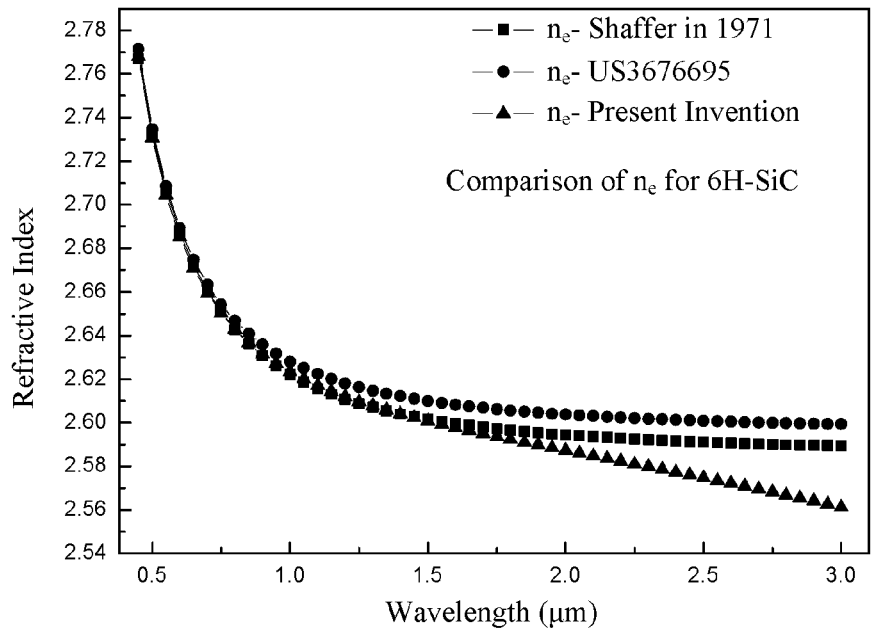
FIG. 2 shows a comparison between a dispersion curve of $n_e$ and prior art $n_e$ data for 6H silicon carbide crystal.
Figure 3:
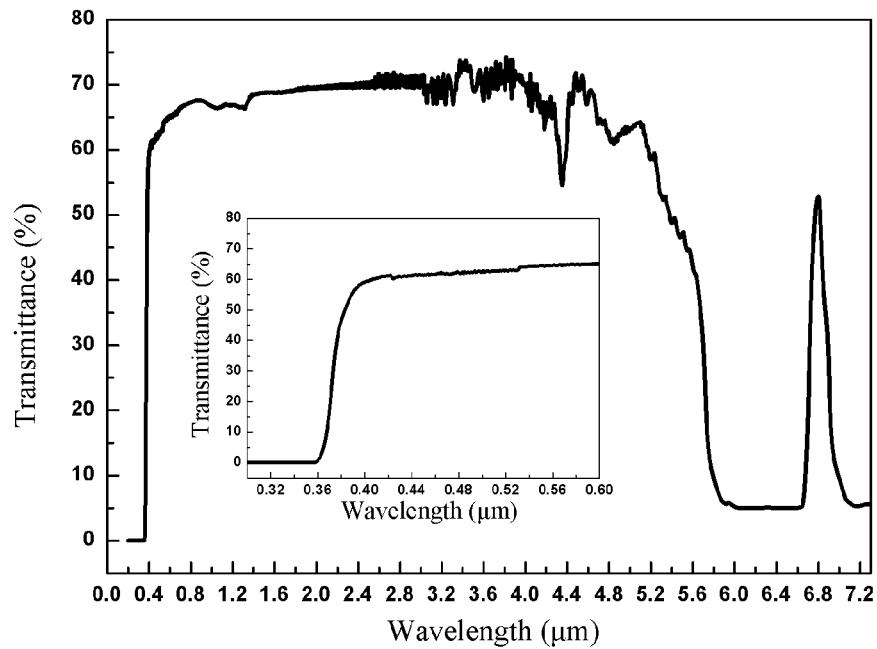
FIG. 3 shows a transmittance curve of 4H silicon carbide crystal.

According to an embodiment, the 4H silicon carbide crystal is grown by physical vapor transport, with a transmittance spectrum as shown in FIG. 3. However, it is to be noted that it is also possible to grow 4H silicon carbide crystal with a relatively great transmittance by high-temperature chemical vapor deposition, liquid phase methods, or the like.

The inventors measure refractive indices of the 4H silicon carbide crystal in the visible and infrared band (0.4047-2.325 μm) by the method of minimum deviation angle, with a precision of about $3\times10^{-5}$, and also measure refractive indices for o-ray of the 4H silicon carbide crystal in a mid-infrared band (3-5 μm) by the arbitrary ray deviation method, and then obtain dispersion equations thereof.

The measured results are shown in Table 1, where $n_o$ indicates the refractive index for o-ray of the 4H silicon carbide crystal, and $n_e$ indicates a refractive index for e-ray of the 4H silicon carbide crystal.

TABLE 1

Measured Refractive Indices of 4H Silicon Carbide Crystal at Room Temperature

| Wavelength (μm) | $n_o$ | $n_e$ |
| --- | --- | --- |
| 0.4047 | 2.75980 | 2.82891 |
| 0.4358 | 2.72794 | 2.79222 |
| 0.48 | 2.69479 | 2.75447 |
| 0.5461 | 2.66131 | 2.71665 |
| 0.5875 | 2.64634 | 2.69984 |
| 0.6438 | 2.63085 | 2.68251 |
| 0.7065 | 2.61792 | 2.66811 |
| 0.8521 | 2.59832 | 2.64638 |
| 1.014 | 2.58290 | 2.63203 |

TABLE 1-continued

Measured Refractive Indices of 4H Silicon
Carbide Crystal at Room Temperature

| Wavelength (μm) | $n_o$ | $n_e$ |
|---|---|---|
| 1.53 | 2.56448 | 2.60938 |
| 1.8 | 2.55736 | 2.60173 |
| 1.97 | 2.55325 | 2.59735 |
| 2.325 | 2.54479 | 2.58837 |
| 3.0 | 2.5288 | |
| 3.5 | 2.5131 | |
| 4.0 | 2.4932 | |
| 4.5 | 2.4704 | |
| 5.0 | 2.4440 | |

Figure 4:
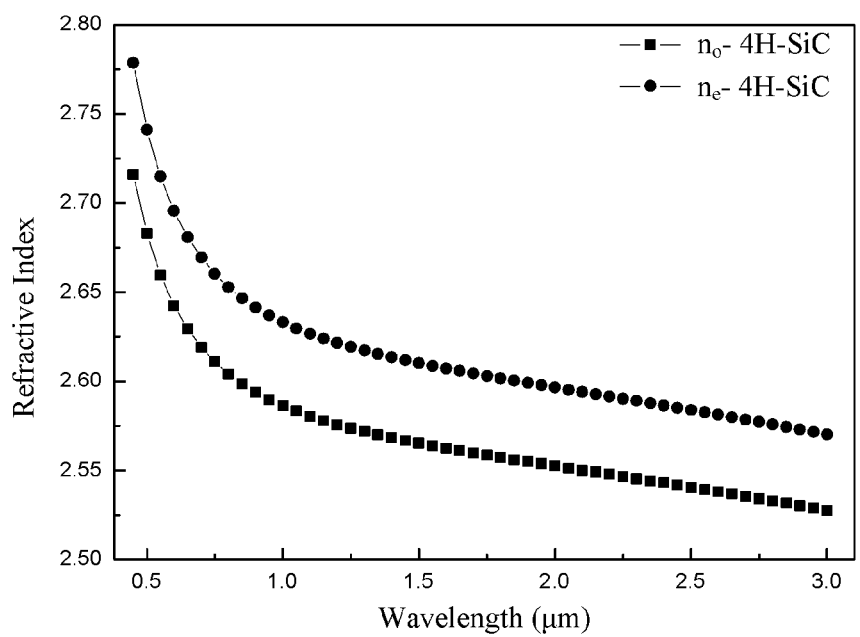
FIG. 4 shows a dispersion curve of 4H silicon carbide crystal.

According to an embodiment, the refractive indices of the 4H silicon carbide crystal may be fitted by Sellmeier equations as follows:

$$n_o^2(\lambda) = 1 + \frac{0.20075\lambda^2}{\lambda^2 + 12.07224} + \frac{5.54861\lambda^2}{\lambda^2 - 0.02641} + \frac{35.65066\lambda^2}{\lambda^2 - 1268.24708},$$

and $$n_e^2(\lambda) = 6.79485 + \frac{0.15558}{\lambda^2 - 0.03535} - 0.02296\lambda^2,$$

where the wavelength λ is in micrometers. A dispersion curve of the 4H silicon carbide crystal is shown in FIG. 4.

The 4H silicon carbide crystal has a relatively greater birefringence than that of the 6H silicon carbide crystal. As a result, it is possible for the 4H silicon carbide crystal to achieve phase matching for nonlinear optical frequency conversion. Experiments show that the 4H silicon carbide crystal can achieve phase matching for nonlinear optical frequency conversion to output laser in a mid-infrared band. Therefore, the 4H silicon carbide crystal is more compatible with practical applications in terms of tunably outputting laser in a mid-infrared band of 3.4-7.1 μm, and thus are more applicable in practice.

Hereinafter, some embodiments of tunable mid-infrared lasers manufactured with the 4H silicon carbide crystal will be explained.

According to an embodiment of the present disclosure, a nonlinear optical device may comprise at least a nonlinear optical crystal. The device may receive at least a laser light beam as incident light, which passes through the nonlinear optical crystal to generate at least an output laser light beam at a frequency different from that of the incident light. The nonlinear optical crystal may comprise a 4H silicon carbide crystal. The device may achieve a tunable mid-infrared laser output by means of optical parametric amplification, optical parametric oscillation, difference frequency generation, or the like.

Figure 5:
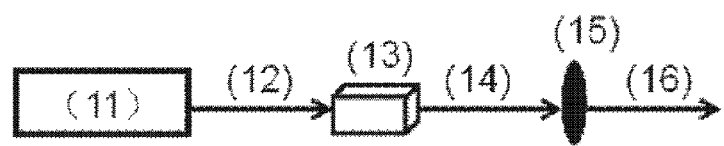
FIG. 5 is a schematic view showing a structure according to an embodiment of the present disclosure.

FIG. 5 is a diagram schematically showing a principle of this embodiment. A laser (11) emits an incident laser light beam (12). The incident laser light beam passes through a 4H silicon carbide crystal (13), to generate, by means of optical parametric amplification, optical parametric oscillation, difference frequency generation, or the like in the 4H silicon carbide crystal (13), a laser light beam (14), which in turn passes through a light filter (15). The light filter (15) may be configured to filter out the incident laser light beam (12). As a result, a mid-infrared laser light beam (16) is outputted.

In this embodiment, the 4H silicon carbide crystal may comprise any one as described above.

The incident light may have a wavelength in a range of 0.38-5.5 μm. The 4H silicon carbide crystal may have a transmittance greater than 10% in a wavelength range of 0.38-5.5 μm and 6.7-6.9 μm.

For example, the incident light is emitted at a wavelength of 0.8 μm. In this case, the transmittance is greater than 40%. However, the present disclosure is not limited thereto. The incident light may have a wavelength of 0.38 μm, 5.5 μm, or any value between 0.38-5.5 μm.

The 4H silicon carbide crystal can achieve Type II phase matching for nonlinear optical frequency conversion.

The 4H silicon carbide crystal may be configured to achieve critical phase matching for nonlinear optical frequency conversion by adjusting a temperature of the crystal.

The 4H silicon carbide crystal may have at least one surface thereof optically polished.

The 4H silicon carbide crystal may have a surface thereof coated with an anti-reflective film, a high reflective film and/or a transreflective film.

Figure 6:
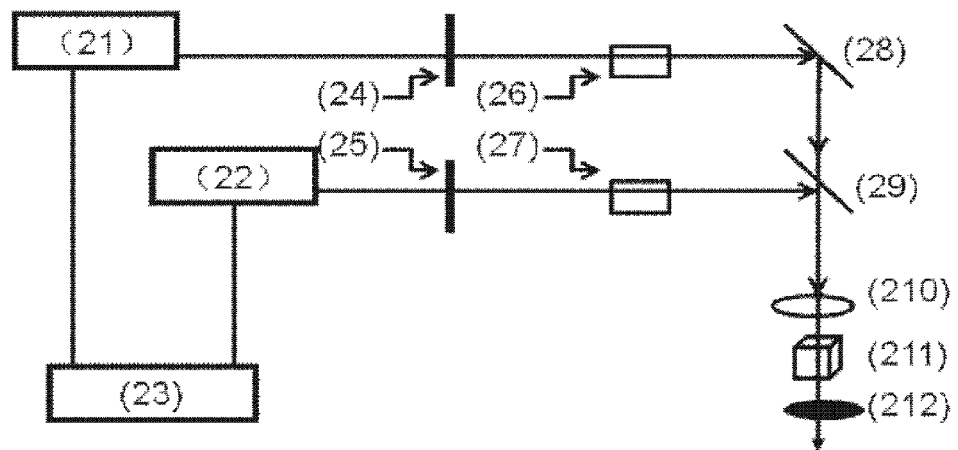
FIG. 6 is a schematic view showing a structure according to a further embodiment of the present disclosure.

According to a further embodiment of the present disclosure, a tunable mid-infrared laser may be manufactured with 4H silicon carbide crystal. FIG. 6 is a structural view schematically showing a tunable mid-infrared laser. As shown in FIG. 6, the tunable mid-infrared laser may comprise a first pumping light source (21), a second pumping light source (22), a laser synchronization device (23), a polarization plate (24), a further polarization plate (25), an isolator (26), a further isolator (27), a mirror (28), a dichroic mirror (29), a convergent lens (210), a 4H silicon carbide crystal (211), and a light filter (212). A laser light beam emitted from the first pumping light source passes through the polarization plate (24), the isolator (26), the mirror (28), the dichroic mirror (29), the convergent lens (210), and the 4H silicon carbide crystal (211) in sequence. A laser light beam emitted from the second pumping light source passes through the further polarization plate (25), the further isolator (27), the dichroic mirror (29), the convergent lens (210), and the 4H silicon carbide crystal (211) in sequence.

The light emitted from the first pumping light source may have a wavelength in a range of 0.8-0.9 μm, and the light emitted from the second pumping light source may have a wavelength of 1.064 μm. Each of the first pumping light source and the second pumping light source may comprise a mode locked laser or a Q-switching laser. The mode locked laser may comprise an active mode locked laser, a passive mode locked laser, or a self mode locked laser. The Q-switching laser may comprise an active electro-optic Q-switching laser, an acousto-optic Q-switching laser, or a passive Q-switching laser.

The first pumping light source may comprise a tunable Ti:sapphire laser, and the second pumping light source may comprise a Nd:YAG laser.

Each of the first pumping light source and the second pumping light source may be configured to achieve xenon lamp pumping, semiconductor laser pumping, or solid laser pumping. The second pumping light source may comprise a gain medium, such as Nd:YAG, Nd:YVO$_4$, or Nd:YLF.

The first pumping light source and the second pumping light source may be synchronized with each other by the synchronization device, and emit their respective light beams to pass through the polarization plate, the isolator, the mirror, and the dichroic mirror, which then are incident onto the 4H silicon carbide crystal by the convergent lens for difference frequency, with a prescribed phase matching condition satisfied, so as to emit mid-infrared laser light through the light filter (212).

In this embodiment, the 4H silicon carbide crystal may comprise any one as described in the above embodiments.

The incident light may have a wavelength in a range of 0.7-0.9 μm and 1.064 μm. The 4H silicon carbide crystal may have a transmittance greater than 10% in a frequency range of 0.38-5.5 μm and 6.7-6.9 μm.

For example, the incident light is emitted at a wavelength of 0.838 μm. In this case, the transmittance is greater than 40%. However, the present disclosure is not limited thereto. The incident light may have a wavelength of 0.38 μm, 5.5 μm, or any value between 0.38-5.5 μm.

The 4H silicon carbide crystal can achieve Type II phase matching for nonlinear optical frequency conversion.

The 4H silicon carbide crystal may be configured to achieve critical phase matching for nonlinear optical frequency conversion by adjusting a temperature of the crystal.

The 4H silicon carbide crystal may have at least one surface thereof optically polished.

The 4H silicon carbide crystal may have a surface thereof coated with an anti-reflective film, a high reflective film and/or a transreflective film.

The 4H silicon carbide crystal may have a cutting angle of θ, i.e., an angle between a light passing direction and an optical axis of the crystal.

It is possible to tune the mid-infrared difference-frequency output by adjusting the output wavelength of the first pumping light source and/or the orientation of the 4H silicon carbide crystal.

Figure 7:
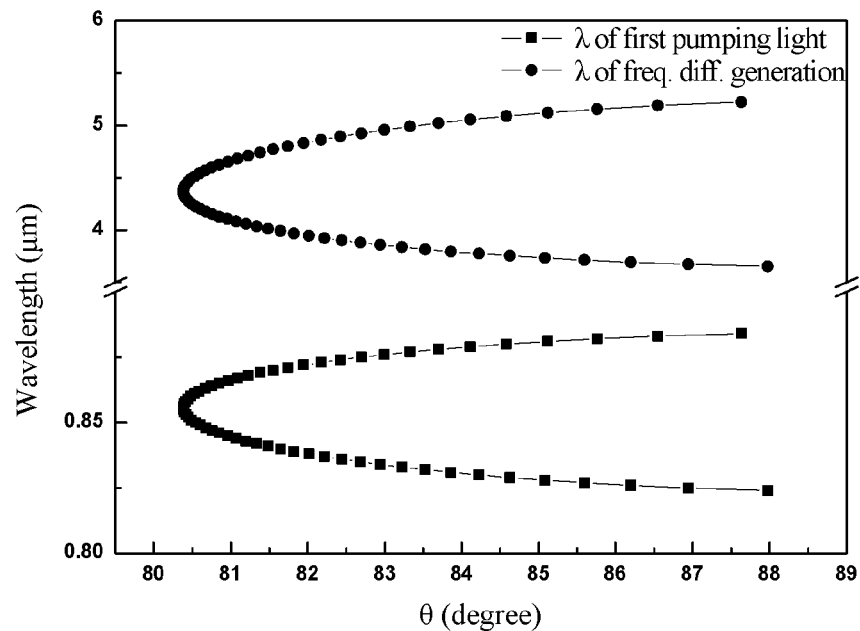
FIG. 7 is a tuning curve showing Type II phase matching for difference frequency generation between a first pumping light source and a second pumping light source according to an embodiment of the present disclosure.

FIG. 7 shows a relationship of the wavelength of the first pumping light source and the wavelength of the difference-frequency output vs. the angle θ.

According to an embodiment, the cutting angle θ may be in a range of 79°-89°, for example, 82°. The output wavelength of the first pumping light source may be in a range of 0.8 μm-0.9 μm, for example, 0.838 μm. The difference-frequency output light may have a wavelength in a range of 3.6-5.3 μm, for example, 3.945 μm.

According to a further embodiment of the present disclosure, each of the first and second pumping light source may comprise a Ti:sapphire laser.

Figure 8:
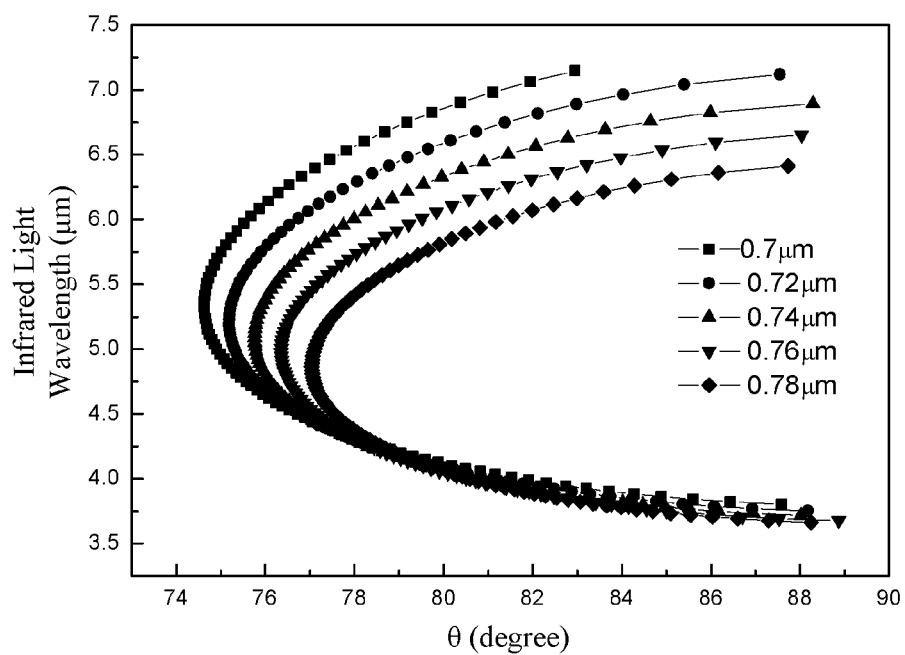
FIG. 8 is a tuning curve showing Type II phase matching for difference frequency generation between a first pumping light source and a second pumping light source according to an embodiment of the present disclosure.

FIG. 8 shows a relationship of the wavelength of the mid-infrared difference-frequency light vs. the crystal cutting angle θ in a case where the wavelength of the first pumping light source is 0.7 μm, 0.72 μm, 0.74 μm, 0.76 μm, and 0.78 μm, respectively, and the wavelength of the second pumping light source is in a range of 0.7-0.9 μm.

In this embodiment, the wavelength of the mid-infrared difference-frequency light may be in a range of 3.6-7 μm, for example, 4.0 μm. The crystal cutting angle θ may be in a range of 73°-89°, for example, 81.5°.

Figure 9:
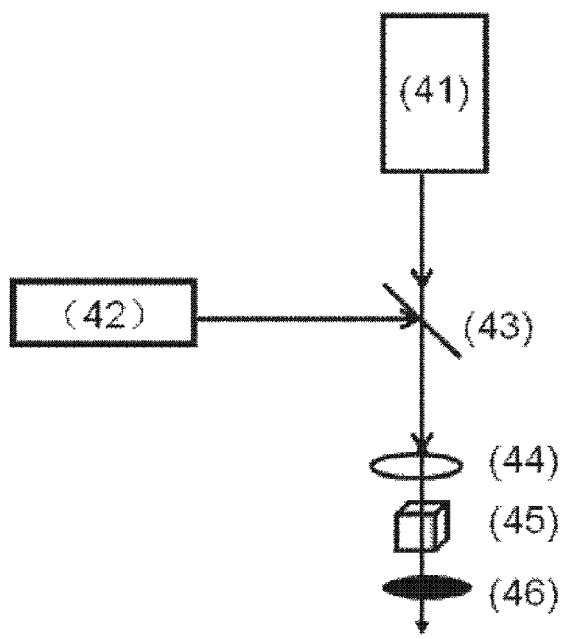
FIG. 9 is a schematic view showing a structure according to a still further embodiment of the present disclosure.

According to a further embodiment of the present disclosure, an optical parametric amplifier device may be manufactured with a 4H silicon carbide crystal. As shown in FIG. 9, the optical parametric amplifier device may comprise a third pumping light source (41), a wide-band signal light laser (42), a dichroic mirror (43), a convergent lens (44), a 4H silicon carbide crystal (45), and a light filter (46). The third pumping light source may comprise a laser of 532 nm. A laser light beam emitted from the third pumping light source (41) may pass through the dichroic mirror (43), the convergent lens (44), and the 4H silicon carbide crystal (45) in sequence. A signal light beam emitted from the wide-band signal light laser (42) may pass through the dichroic mirror (43), the convergent lens (44), and the 4H silicon carbide crystal (45) in sequence.

The 532 nm laser, serving as the third pumping light source, may be achieved by a second harmonic generation of 1.064 μm laser. A crystal for the second harmonic generaion may comprise BBO, LBO, KDP, KTP, or CLBO. The 532 nm laser may comprise a mode locked pulse laser or a Q-switching laser. The Q-switching laser may comprise an active electro-optic Q-switching laser, an acousto-optic Q-switching laser, or a passive Q-switching laser. The third pumping light source may be configured to achieve xenon lamp pumping, semiconductor laser pumping, or solid laser pumping.

The pumping light at 532 nm and the signal light from the wide-band signal light laser (42) are incident onto the 4H silicon carbide crystal (45) by means of the convergent lens (44) for optical parametric amplification to emit mid-infrared light, which is further filtered by the light filter (46).

The 4H silicon carbide crystal may comprise any one as described above.

Figure 10:
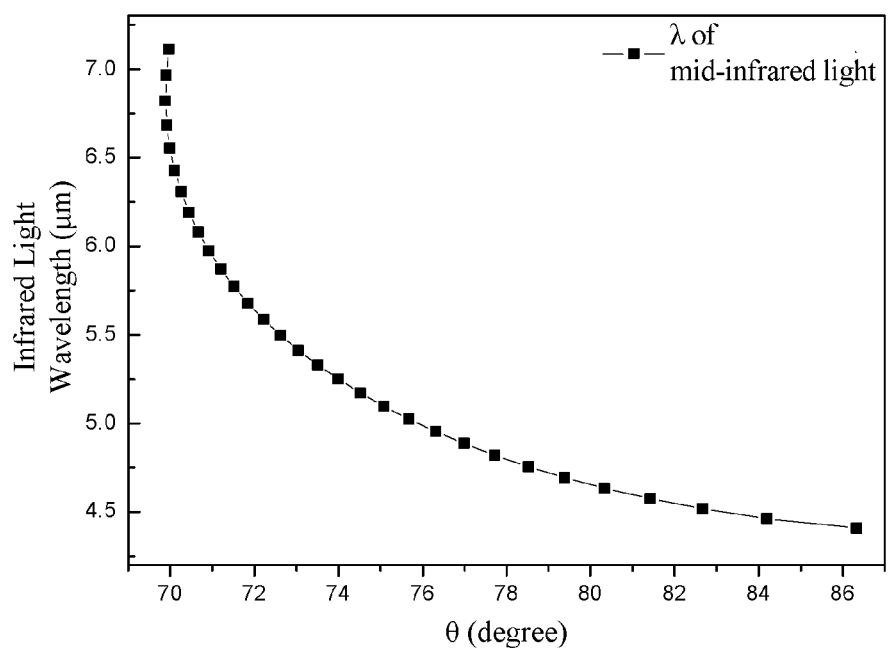
FIG. 10 is a tuning curve showing phase matching for optical parametric amplification of a third pumping light source according to an embodiment of the present disclosure.

FIG. 10 shows a relationship of the wavelength of the mid-infrared light vs. a cutting angle θ of the crystal when the pumping light has a wavelength of 532 nm.

In this embodiment, the crystal cutting angle θ may be in a range of 72°-88°, for example, 78°. The wavelength of the mid-infrared light may be in a range of 4.3-7 μm, for example, 4.756 μm.

Figure 11:
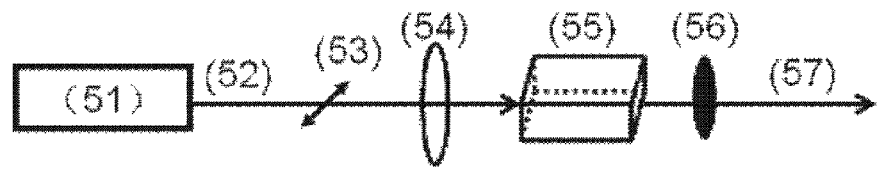
FIG. 11 is a schematic view showing a structure according to a still further embodiment of the present disclosure.

According to a further embodiment of the present disclosure, a wide-band tunable mid-infrared laser may be manufactured with a 4H silicon carbide crystal. FIG. 11 is a structural view schematically showing the wide-band tunable mid-infrared laser. As shown in FIG. 11, the wide-band tunable mid-infrared laser may comprise a fourth pumping light source (51), a convergent lens (54), a 4H silicon carbide crystal (55), and a light filter (56). A laser light beam emitted from the fourth pumping light source may pass through the convergent lens (54), the 4H silicon carbide crystal (55), and the light filter (56) in sequence.

Figure 12:
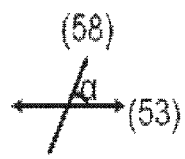
FIG. 12 is a schematic view showing an angle between a polarization direction of incident laser light and a main section of a crystal according to an embodiment of the present disclosure.

The pumping light (52) from the fourth pumping light source (51) may comprise linearly polarized light at a polarization direction (53) inclined with respect to a main section of the crystal at an angle α, which satisfies 0<α<90°, for example, α=41°. As shown in FIG. 12, the reference symbol (58) indicates a line where the main section of the crystal crosses the sheet.

Figure 13:
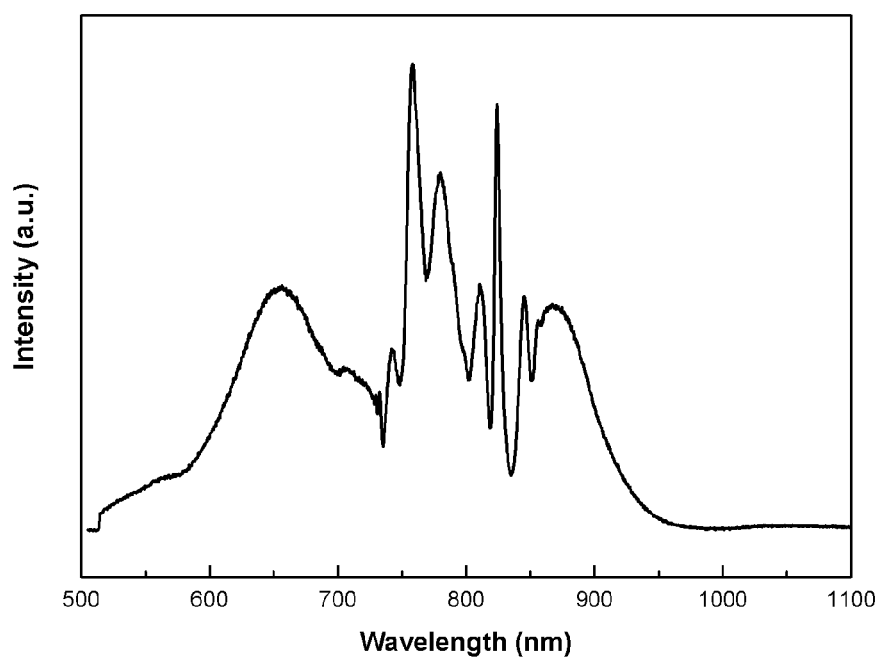
FIG. 13 shows a spectrum of a fourth pumping light source according to an embodiment of the present disclosure.

The fourth pumping light source may comprise a femtosecond Ti:sapphire laser having a repetition frequency of 1 KHz and a pulse width of 20 fs, and covering a spectrum of 500-1000 nm. FIG. 13 shows an ultra-continuous spectrum of the fourth pumping light source (51) according to this embodiment. The pumping light (52) from the fourth pumping light source may generate both an o-ray beam and an e-ray beam in the 4H silicon carbide crystal. A relatively high frequency component and a relatively low frequency component of the ultra-continuous wide-spectrum femtosecond pulse may be directly subjected to a difference frequency operation in the 4H silicon carbide crystal (55), and then pass through the light filter (56) to emit the mid-infrared laser light.

In this embodiment, the 4H silicon carbide crystal may comprise any one as described in the above embodiments.

The incident light may have a wavelength in a range of 0.38-1.0 μm. The 4H silicon carbide crystal may have a transmittance greater than 10% in a frequency range of 0.38-5.5 μm and 6.7-6.9 μm.

The 4H silicon carbide crystal can achieve Type II phase matching for nonlinear optical frequency conversion.

The 4H silicon carbide crystal may be configured to achieve critical phase matching for nonlinear optical frequency conversion by adjusting a temperature of the crystal.

The 4H silicon carbide crystal may have at least one surface thereof optically polished.

The 4H silicon carbide crystal may have a surface thereof coated with an anti-reflective film, a high reflective film and/or a transreflective film.

The 4H silicon carbide crystal may have a cutting angle of θ, i.e., an angle between a light passing direction and an optical axis of the crystal.

According to an embodiment, the cutting angle θ may be in a range of 79°-89°. The difference-frequency output light may have a wavelength in a range of 3.6-7 μm.

Figure 14:
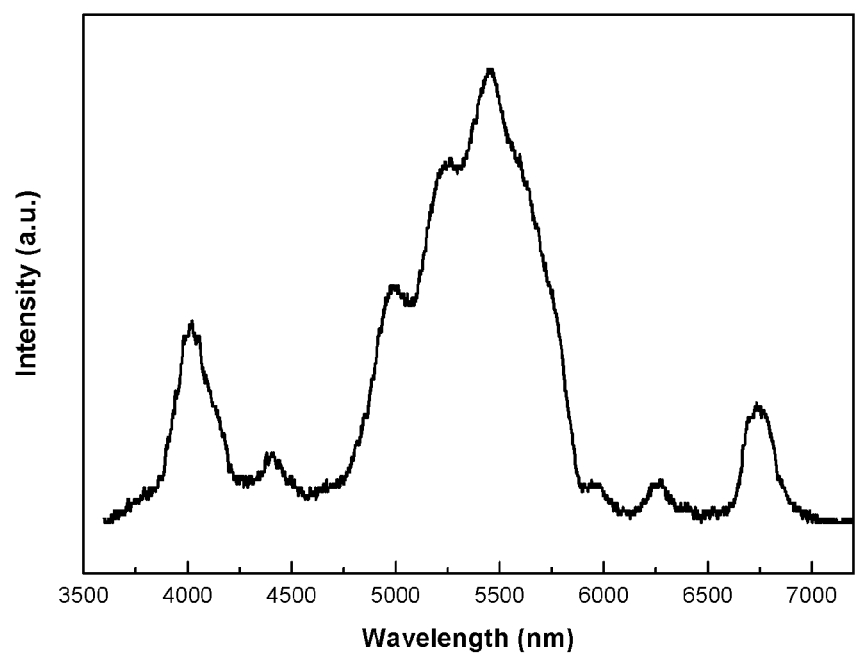
FIG. 14 shows a spectrum of mid-infrared laser light generated by means of difference frequency generation according to an embodiment of the present disclosure.

FIG. 14 shows a spectrum of the wide-band mid-infrared difference-frequency light when the crystal cutting angle is 82°.

According to the embodiments of the present disclosure, nonlinear optical frequency conversion in the mid-infrared band may be achieved by the 4H silicon carbide crystal. As compared to existing nonlinear optical devices, the nonlinear optical device disclosed herein is more compatible with practical applications in terms of outputting mid-infrared laser at high power and high quality and thus are more applicable in practice, because the 4H silicon carbide crystal has a relatively high laser induced damage threshold, a relative broad transmissive band (0.38-5.9 μm and 6.6-7.08 μm), a relatively great $2^{nd}$-order nonlinear optical coefficient ($d_{15}$=6.7 pm/V), a relatively great birefringence, a high thermal conductivity (490 $Wm^{-1}K^{-1}$), and a high chemical stability.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A nonlinear optical device, comprising:
at least a 4H silicon carbide crystal configured to alter, by nonlinear optical frequency conversion based on type II phase matching, at least a first light beam at a frequency to generate at least another light beam at a further frequency different from the frequency of the first light beam, wherein the generated light beam has a wavelength in a range of 3.4-7.1 μm.

2. The nonlinear optical device according to claim 1, wherein the 4H silicon carbide crystal has a space group of $P6_3mc$, where each crystal cell includes four carbon/silicon atom layers arranged in ABCB.

3. The nonlinear optical device according to claim 1, wherein the 4H silicon carbide crystal is configured to achieve critical phase matching for nonlinear optical frequency conversion by adjusting a temperature of the crystal.

4. The nonlinear optical device according to claim 1, wherein the 4H silicon carbide crystal has at least one surface thereof optically polished.

5. The nonlinear optical device according to claim 1, wherein the 4H silicon carbide crystal has a surface thereof coated with an anti-reflective film, a high reflective film and/or a transreflective film.

6. The nonlinear optical device according to claim 1, further comprising at least a laser configured to generate the light beam at the frequency to be incident onto the 4H silicon carbide crystal.

* * * * *